(12) United States Patent
Level

(10) Patent No.: US 9,233,634 B1
(45) Date of Patent: Jan. 12, 2016

(54) BIKE DRAGGER

(71) Applicant: Chad Level, Bixby, OK (US)

(72) Inventor: Chad Level, Bixby, OK (US)

(*) Notice: Subject to any disclaimer, the term of this patent is extended or adjusted under 35 U.S.C. 154(b) by 28 days.

(21) Appl. No.: 14/120,863

(22) Filed: Jul. 3, 2014

(51) Int. Cl.
    *B60D 1/167* (2006.01)
    *B60P 3/077* (2006.01)

(52) U.S. Cl.
    CPC ................... *B60P 3/077* (2013.01)

(58) Field of Classification Search
    USPC .......... 414/462, 463, 466, 427; 280/402, 504; 224/519
    See application file for complete search history.

(56) References Cited

U.S. PATENT DOCUMENTS

| | | | |
|---|---|---|---|
| 3,430,983 A | 3/1969 | Jones | |
| 5,620,197 A | 4/1997 | Howes | |
| 5,938,226 A | 8/1999 | Transchel | |
| 5,984,613 A * | 11/1999 | Motilewa | B60R 9/06 414/462 |
| 6,099,012 A | 8/2000 | Mortimer | |
| 6,244,813 B1 | 6/2001 | Cataldo | |
| 6,352,401 B1 * | 3/2002 | LeMay | B60P 3/125 280/402 |
| 6,682,292 B2 | 1/2004 | Estes | |
| 7,537,234 B2 * | 5/2009 | McClellan | B60P 3/077 280/402 |
| 7,704,034 B1 * | 4/2010 | Quigley, III | B60P 3/125 414/462 |
| 7,997,606 B1 * | 8/2011 | Sandelius | B60P 3/077 414/462 |
| 8,075,012 B1 | 12/2011 | Perez | |
| 8,585,072 B2 | 11/2013 | Momaly | |
| 8,602,437 B1 * | 12/2013 | Morris | B60R 9/10 414/462 |
| 2006/0062657 A1 | 3/2006 | Davis | |
| 2007/0024024 A1 * | 2/2007 | Maynard | B60P 3/077 280/402 |

* cited by examiner

*Primary Examiner* — Paul T Chin
(74) *Attorney, Agent, or Firm* — Randal Homburg

(57) ABSTRACT

A detachable hitch mounting motorcycle transport caddy defining a powered elevated lift integrated with the towing vehicle electrical system, a wheel support frame, extending tie bars and an integrated electrical wiring system for connection to the motorcycle to apply transport signaling to the motorcycle from the tow vehicle, the wheel support frame lowered to the ground to load the motorcycle without requiring and ramp or lifting and raised into a transport position, placing the motorcycle rear wheel as the road contact wheel as the motorcycle is towed in a neutral position.

5 Claims, 6 Drawing Sheets

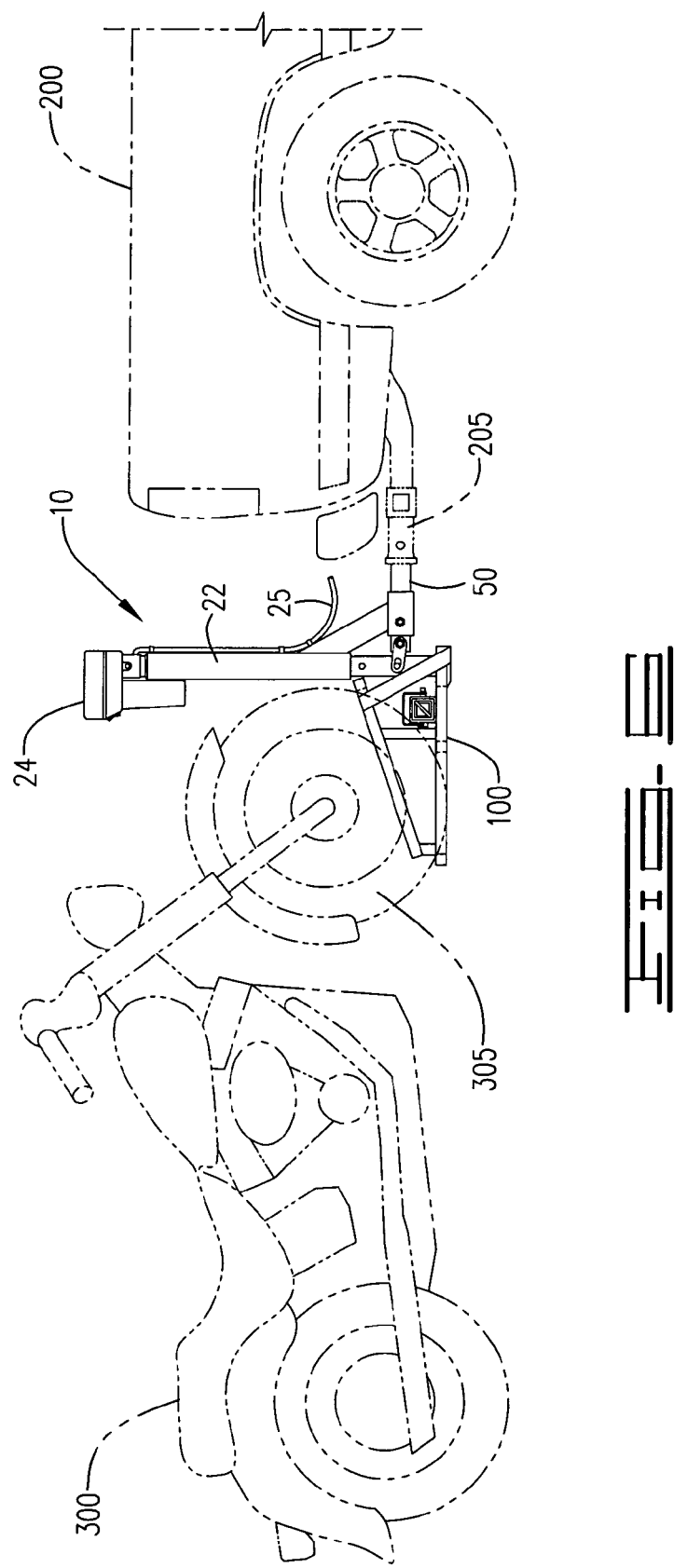
FIG. H

BIKE DRAGGER

CROSS REFERENCE TO RELATED APPLICATIONS

None.

I. BACKGROUND OF THE INVENTION

1. Field of Invention

A detachable hitch mounting motorcycle transport caddy defining a powered elevated lift integrated with the towing vehicle electrical system, a wheel support frame, extending tie bars and an integrated electrical wiring system for connection to the motorcycle to apply transport signaling to the motorcycle from the tow vehicle, the wheel support frame lowered to the ground to load the motorcycle without requiring and ramp or lifting and raised into a transport position, placing the motorcycle rear wheel as the road contact wheel as the motorcycle is towed in a neutral position.

2. Description of Prior Art

A preliminary review of prior art patents was conducted by the applicant which reveal prior art patents in a similar field or having similar use. However, the prior art inventions do not disclose the same or similar elements as the present box hitch mounting motorcycle caddy, nor do they present the material components in a manner contemplated or anticipated in the prior art.

In U.S. Pat. No. 8,602,437 to Morris, a motorcycle caddy discloses a box hitch connection, a lift (manual), a wheel cradle and a collapsible frame. However, unlike Morris, the present invention includes an electrical connection and motorcycle electrical system integrated into the tow vehicle which activate the signal and running lights of the towed motorcycle. Several other prior art patents contain a similar type configuration as does Morris, including U.S. Pat. No. 7,537,234 to McClellan, U.S. Patent Application No. 2006/0062657 to Davis, and U.S. Pat. No. 5,620,197 to Howes. Fixed height motorcycle transport devices mounting to a box hitch are disclosed in U.S. Pat. No. 8,075,012 to Perez, U.S. Pat. No. 6,099,012 to Mortimer U.S. Pat. No. 5,938,226 to Transchel and U.S. Pat. No. 3,430,983 to Jones.

A box hitch connection disclosed in U.S. Pat. No. 8,585,072 to Momaly defines a lift and the wheel cradle, but it also includes a frame support extending from the wheel cradle which attaches to the bottom of the motorcycle frame. This prohibits movement of the motorcycle steering system, with the device pivoting laterally from the box hitch. A box hitch connection, a lift a wheel cradle and lateral tie arms that can be disconnected is disclosed in U.S. Pat. No. 6,244,813 to Cataldo.

II. SUMMARY OF THE INVENTION

Transporting a motorcycle in or behind a passenger motor vehicle has generally been accomplished by hauling the motorcycle in the bed of the vehicle, within a trailer towed behind the vehicle or by use of a hitch mounting carrier, as noted above in the prior art. The present bike dragger is disclosed for use as an improved hitch mounting carrier.

The purpose of the bike dragger is to provide a hitch mounting carrier which is lowered and raised between a loading position, where the front wheel of the motorcycle is driven into a wheel carriage, and a transport position, where the front wheel is elevated within the wheel carriage, the front section of the motorcycle secured to assembled frame components of the bike dragger, with the bike dragger connected to the electrical system of the towing vehicle by a wire harness within an electric socket at the rear of the towing vehicle adjacent to the connected towing hitch or box hitch receiver, providing electrical operation for the elevating means within the bike dragger frame and also to connect the motorcycle signal and running lighting for operational use while in tow.

III. DESCRIPTION OF THE DRAWINGS

The following drawings are submitted with this utility patent application.

FIG. 6 is a side view of the bike dragger in a raised position, with phantom lines on the right side of the bike dragger representing a towing vehicle and phantom lines on the left side of the bike dragger representing a motorcycle in tow within the bike dragger.

IV. DESCRIPTION OF THE PREFERRED EMBODIMENT

Figure 4:
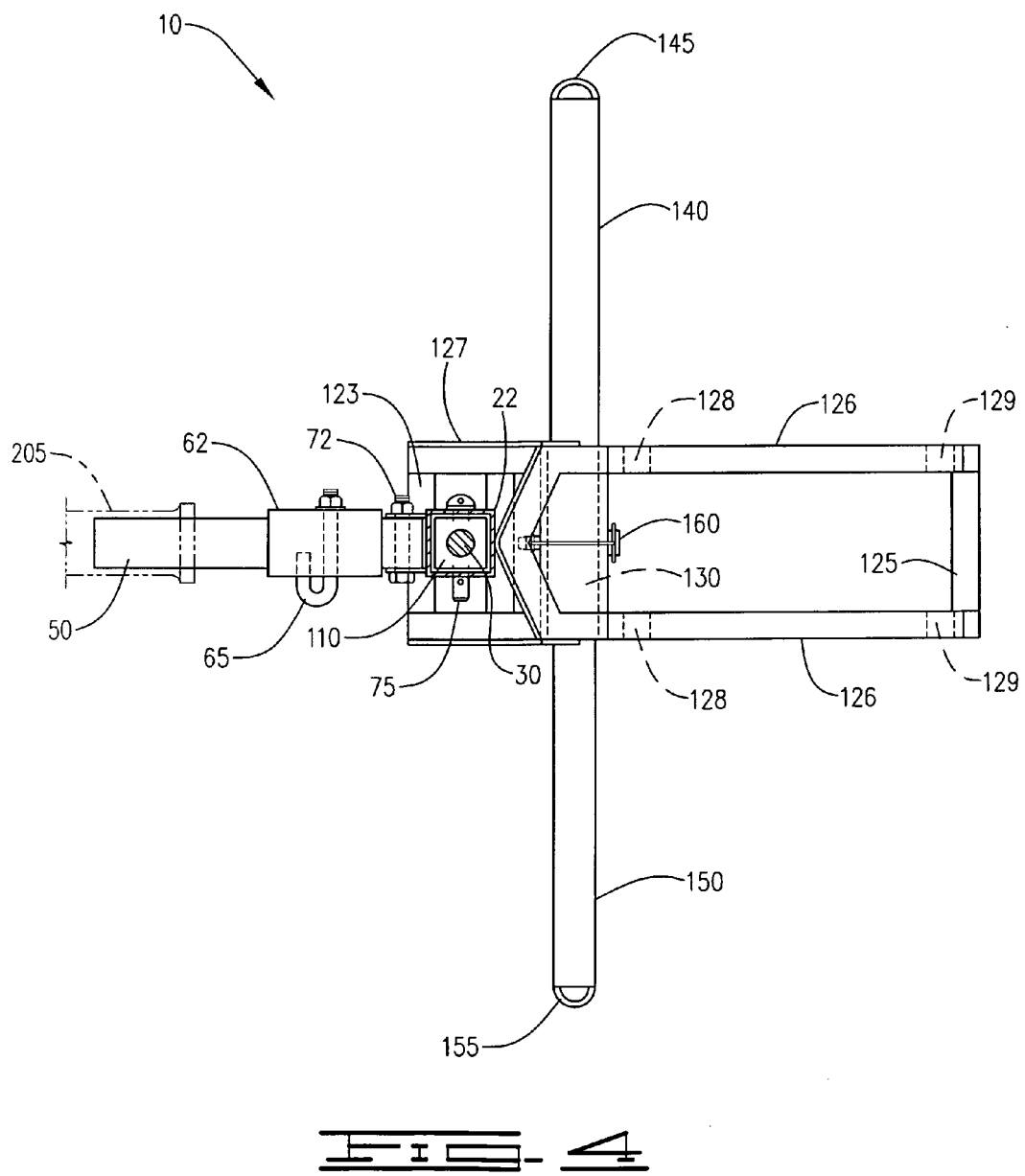
FIG. 4 is a sectional view of the bike dragger along section lines 4/4 of FIG. 3.
Figure 5:
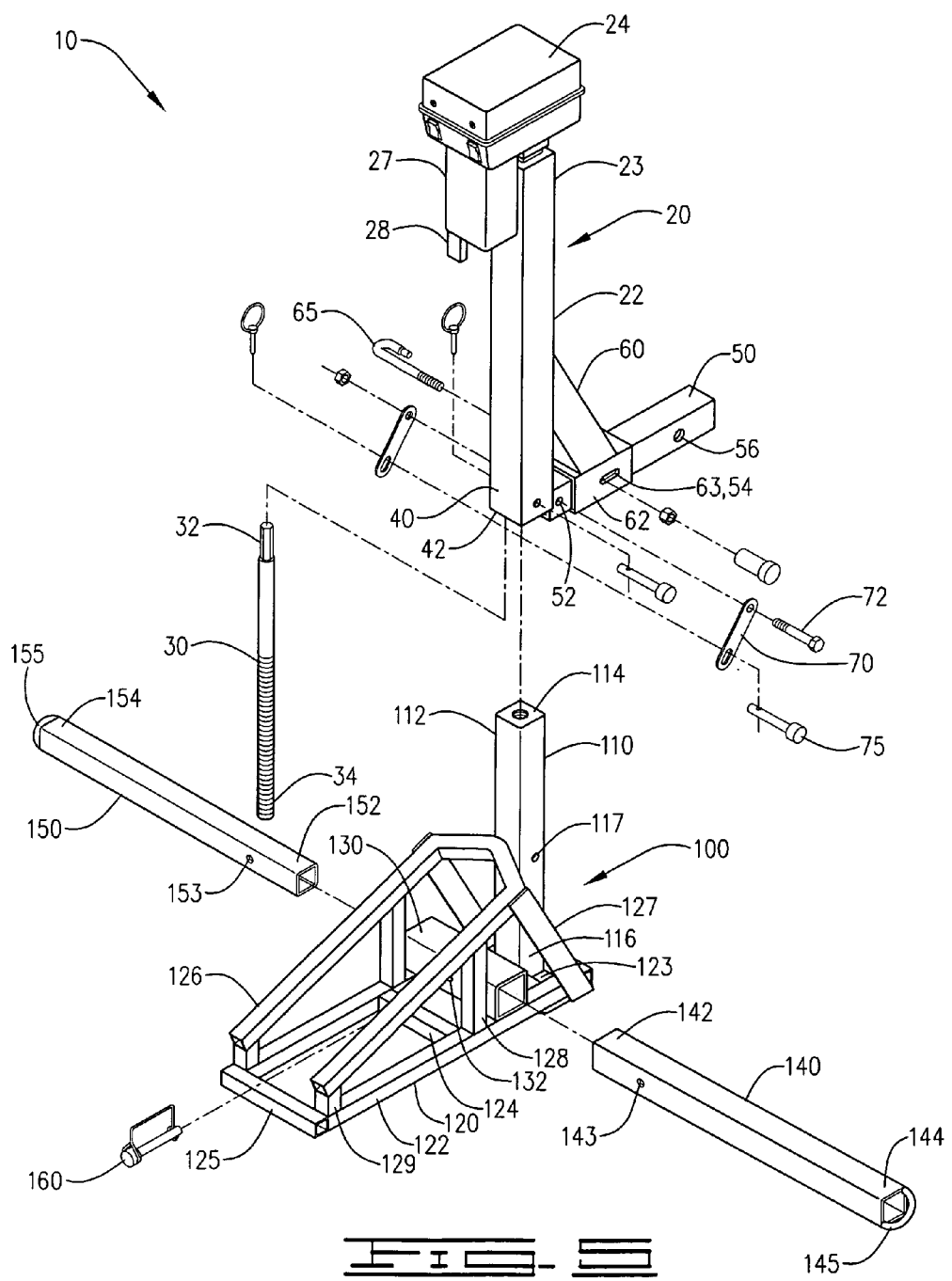
FIG. 5 is an exploded diagram of the bike dragger components.

A motorcycle transport device 10 attaching to the rear receiver hitch 205 of a towing vehicle 200 for the transport of a motorcycle 300, as shown in FIG. 6, the device 10 comprising an upper mounting unit 20 and a lower carriage unit 100. The upper mounting unit 20, FIGS. 1-5, defines a vertical support shaft 22 having an upper end 23 with an electrical jack motor 24 providing low voltage electrical power from the tow vehicle 200 through the connection of a socket plug 26 and tow plug wire 25 to the towing vehicle 200 leading to an electrical junction box 27 mounted to the vertical support shaft 22 and defining a depending plug socket 28 for connection to a motorcycle electrical system, the vertical support shaft 22 further defining a lower end 40 defining a carriage slide receiver 42 and containing an inner threaded shaft 30 providing an upper motor mount stem 32 attached to the electric jack motor 24 and a lower threaded end 34, a receiver hitch bar 50 defining a rear axial bore 52, an intermediary axial bore 54 and a front axial hitch bore 56, the receiver hitch bar 50 inserted with the receiver hitch 205 of the towing vehicle 200, FIGS. 2, 4 and 6, a hitch bracket 60 extending from the vertical support shaft 22 and further attaching a horizontal hitch bar sleeve 62 with an axial bore 63, connecting to the intermediary axial bore 54 of the receiver hitch bar 50 by a sleeve pin 65, FIGS. 4 and 5, and a pivotal lock bracket 70 attaching to the rear axial bore 52 of the receiver hitch bar 50 by a bracket bolt 72.

The lower carriage unit 100, FIGS. 1-5, accepts and secures the front wheel 305 of the motorcycle 300, shown in FIG. 6, during transport of the motorcycle, the lower carriage unit 100 further defining a vertical carriage slide bar 110 attaching a carriage frame 120, a transverse support arm sleeve 130, a first support arm 140 and second support arm 150 providing secondary security of the motorcycle 300 by use of tie straps, not shown. The vertical carriage slide bar 110 defines an upper end 112 defining a threaded shaft receiver 114 accepting the lower threaded end 34 of the inner threaded shaft 30 as the vertical carriage slide bar 110 is inserted within the carriage slide receiver 42 of the lower end 40 of the vertical support shaft 22, the vertical carriage slide bar 110 further defining a lower end 116 having an upper transverse bore 117 and a lower transverse bore 118 accepting a bracket pin 75 connecting the pivotal lock bracket 70 during transport or loading of the motorcycle 300 to relieve force on the electrical jack motor 24 and inner threaded shaft 30, the device shown in FIG. 6 in a transport position. Attaching to the lower end 116 of the vertical carriage slide bar 110 is the carriage frame 120, adapting to the motorcycle front tire 305, FIG. 6, the carriage frame 120 further defining a pair of lower horizontal frame members 122 held parallel by a front cross brace 123, an intermediary cross brace 124 and a rear cross brace 125 and a wheel stand frame 126 held vertically above the pair of lower horizontal frame members 122 by a pair of front stand braces 127, a pair of intermediary stand braces 128, and a pair of rear stand braces 129 with the transverse support arm sleeve 130 secured upon the lower horizontal frame members 122, the transverse support arm sleeve 130 having a sleeve bore 132 from front to back, FIGS. 1-5. The first support arm 140 and the second support arm 150 are first attached together within the transverse support arm sleeve 130, each first and second support arm 140, 150, defining an insert end 142, 152, with an arm bore 143, 153, the arm bores 143, 153, aligning with the sleeve bore 132 and accepting a common arm lock pin 160 to hold them together and in place, each first and second support arm 140, 150, further respectively extending outer ends 144, 154, defining respective strap tie anchors 145, 155, used as an anchor point for tie straps, not shown, to secure the motorcycle 300 in an erect position within the carriage frame 120 during transport.

It is recommended that a securing means, not shown, including auxiliary clamps, straps, or cords be used to strap the front wheel 305 of the motorcycle 300 at one or more locations of the lower carriage unit 100 during transport while the front wheel 305 of the motorcycle 300 is held within the lower carriage unit 100 with the wheel 305 resting within the wheel stand frame 126, between the lower horizontal frame members 122 and upon the rear cross brace 125 and the intermediary cross brace 124. The motorcycle rear wheel is the only wheel in contact with the roadway during transport, with the motorcycle being transported in a neutral gear.

Figure 1:
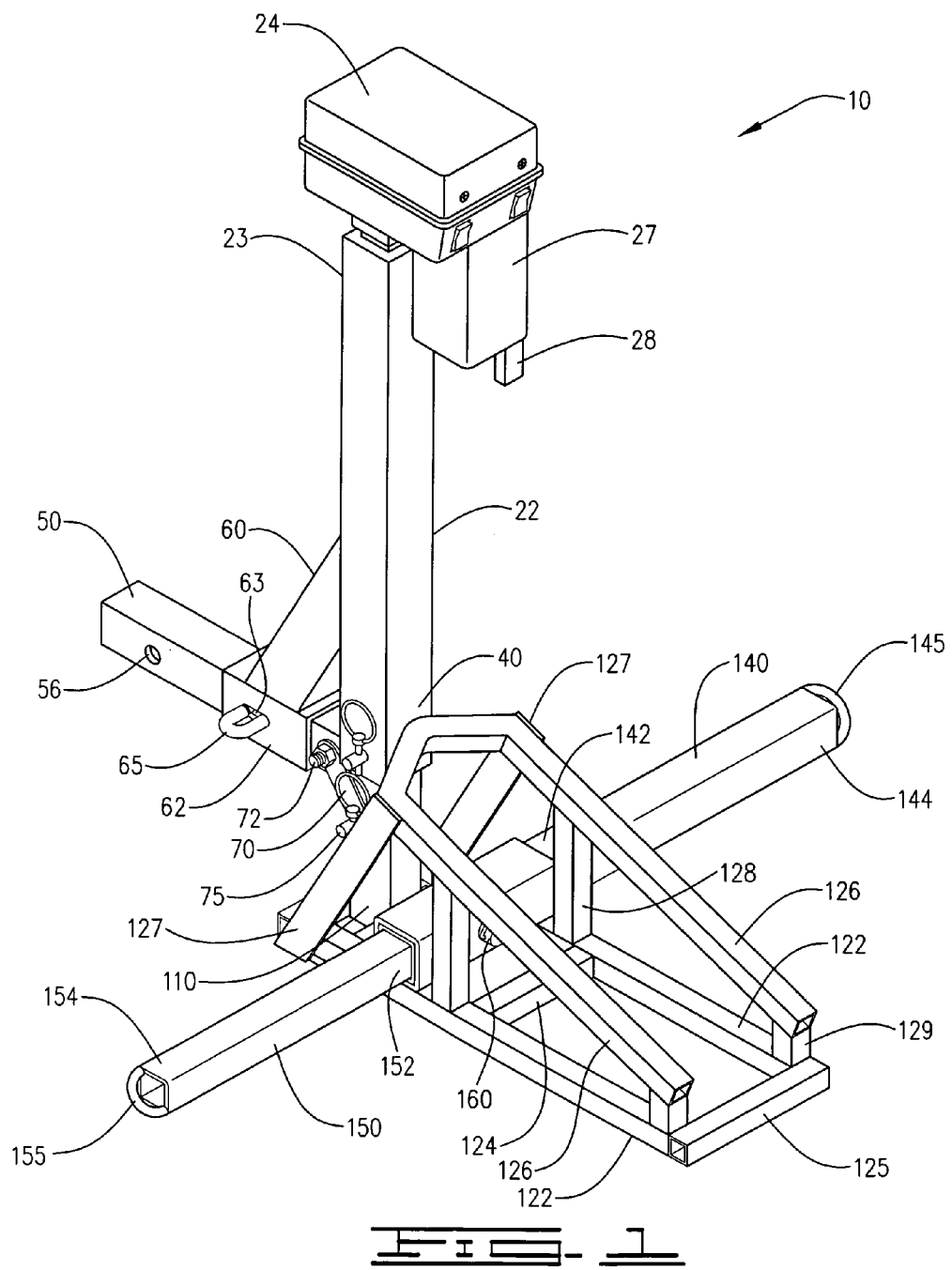
FIG. 1 is a rear perspective view of the bike dragger in a lowered position.
Figure 2:
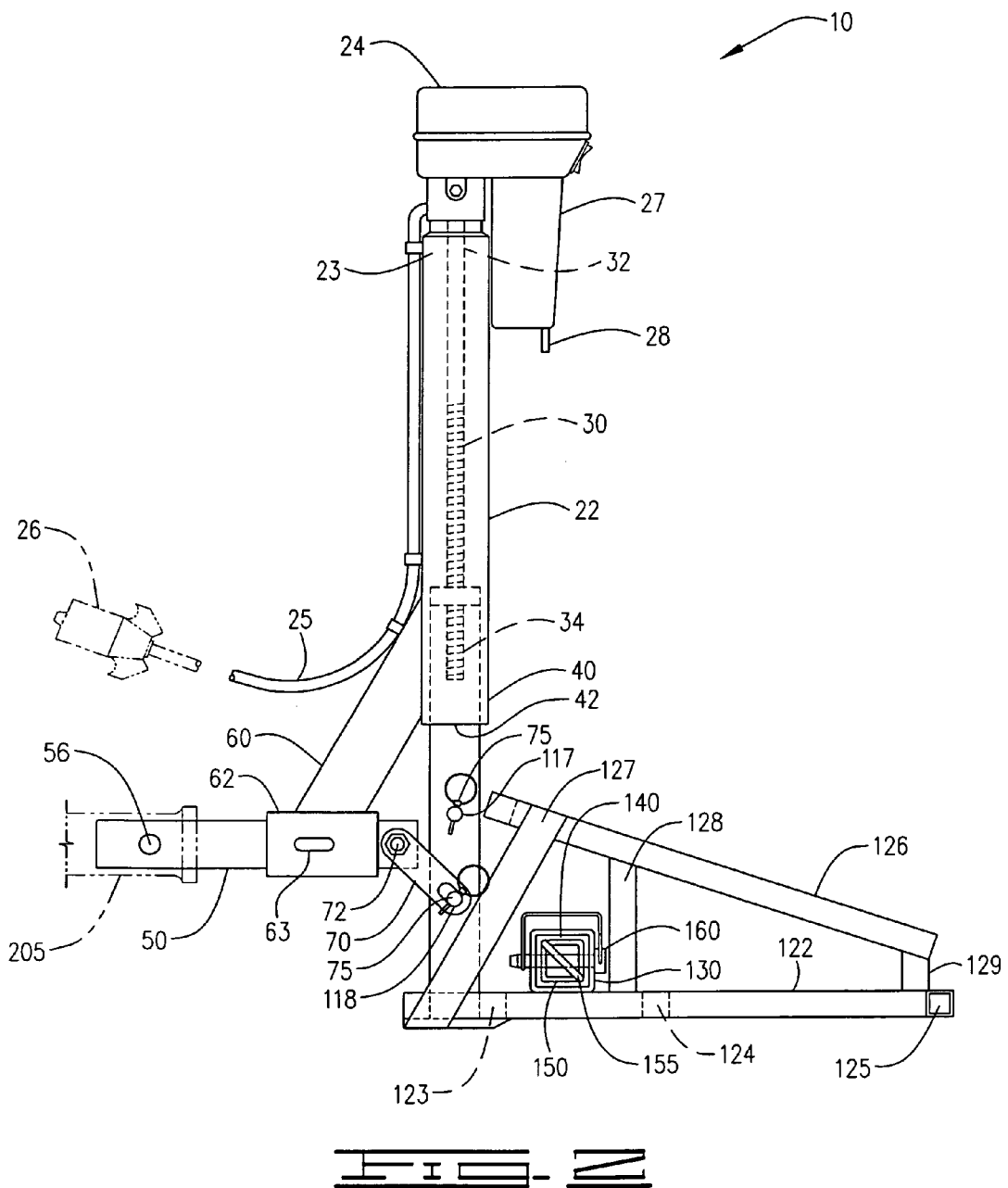
FIG. 2 is a side view of the bike dragger is a lowered position.
Figure 3:
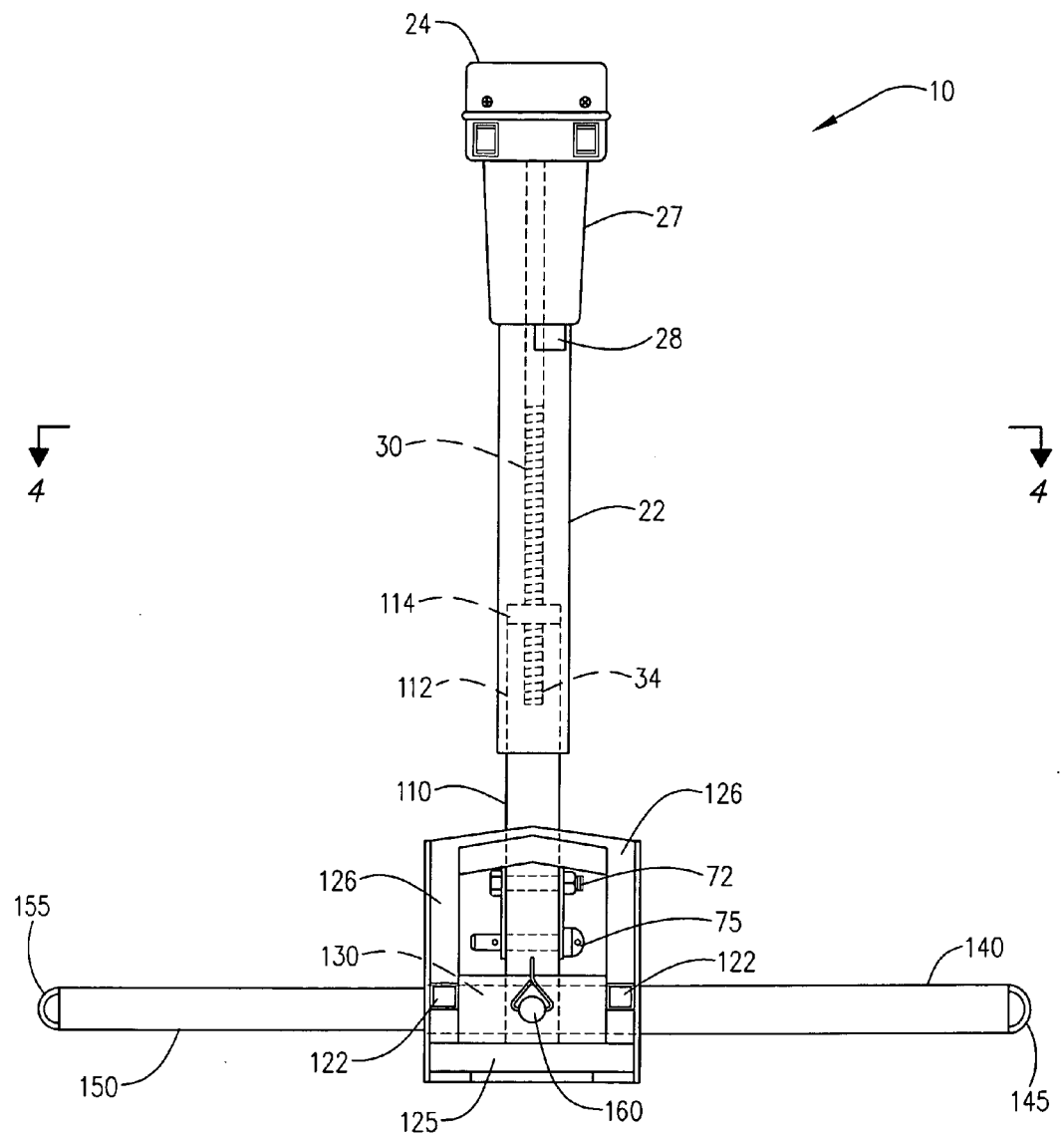
FIG. 3 is a top view of the bike dragger.

The carriage frame 120 is moved between a ground contact loading position, FIGS. 1 and 2, and the previously mentioned elevated transport position, FIG. 6. The carriage frame 120 is elevated and lowered by the electric jack motor 24 which causes the inner threaded shaft 30 connected to the electrical jack motor 24 and with the lower threaded end 34 threadably inserting within the threaded shaft receiver 114 of the vertical carriage slide bar 110, with rotation of the inner threaded shaft 30 in one direction contracting the vertical carriage slide bar 110 within the vertical support shaft 22 and the opposing rotation of the inner threaded shaft 30 extending the vertical carriage slide bar 110 from the vertical support shaft 22, using electrical motor controls, shown in FIGS. 1, 3 and 5, but not claimed, these controls being generic elements commonly found on electrical motors. The source of power for the electric jack motor 24 is provided through the connection of the tow plug wire 25 and socket plug 26 to the towing vehicle electrical system, commonly provided by a rear plug socket near the receiver hitch 205.

In the loading position, the lower horizontal frame members 122 and the rear cross brace 125 are in contact with the ground surface while the front wheel 305 of the motorcycle 300 is driven into the carriage frame 120. The lower carriage unit 100 is them elevated to the transport position, FIG. 6, after which the aforementioned securing means is applied. Prior to transport to ease the burden on the electric jack motor 24, inner threaded shaft 30 and the carriage slide receiver 42, the pivotal lock bracket is secured to either the upper transverse bore 117 or the lower transverse bore 118, which ever is aligned to the proper height, with the bracket pin 75, transferring the weight of the front wheel 305 and the motorcycle 300, to the pin 75 instead of the inner threaded shaft 30 during travel. The bracket pin 75 would further be removed when unloading the motorcycle 300 prior to lowering the lower carriage unit 100 after transport.

The depending plug socket 28 attached below the electrical junction box 27 supplies not only the low voltage power to the electric jack motor 24, but also power and control to the depending plug socket 28 passed on to the motorcycle by supplemental electrical wiring connection, enabling the directional and running lighting on the motorcycle 300 to function while in tow behind the towing vehicle 200, the light of the motorcycle 300 corresponding to the action of the lights of the towing vehicle.

The device may be disassembled when not in use and stored in a compact location. The upper mounting unit 20 can be disconnected from the receiver hitch bar 50 by removal of the sleeve pin 65 and the bracket pin 75, with the lower carriage unit 100 further separating from the vertical support shaft 22 by removal of the inner threaded shaft 30 from the threaded shaft receiver 114. Each first and second support arm 140, 150, is removed from the transverse support arm sleeve 130 by pulling the arm lock pin 160 from the aligned sleeve bore 132 and arm bores, 143, 153. Thus, the disassembled device 10 is separated into the upper mounting unit 20, the lower mounting unit 100 and the disassembled support arms 140, 150, allowing the device 10 to be easily carried and stored in the trunk of a car, a rear deck of an SUV, a storage compartment of a motor home or camper, or a small portion of a pickup bed. As defined within this device 10, the pins 65, 75, 160, may be cotter pins, quick release pins, lock pins, lag pins or any other type of pins used to connect objects having aligned holes. It is also contemplated that the device 10 may contain adaptive elements designed to integrate with other type hitches, tow vehicles and types of motorcycles other than those shown in the drawing figures as long as the principles and material elements defined herein are not beyond the scope of those type devices used to tow a motorcycle behind a towing vehicle.

While the motorcycle transport device has been particularly shown and described with reference to a preferred embodiment thereof, it will be understood by those skilled in the art that changes in form and detail may be made therein without departing from the spirit and scope of the invention.

What is claimed is:

1. A motorcycle transport device attaching to a rear receiver hitch of a towing vehicle for the transport of an elevated front wheel of a motorcycle being towed in a neutral gear, the device comprising:

an upper mounting unit defining a vertical support shaft having an upper end attaching an electrical jack motor providing low voltage electrical power from said towing vehicle and a lower end defining a carriage slide receiver and containing an inner threaded shaft providing an upper motor mount stem attached to said electric jack motor and a lower threaded end, a receiver hitch bar connecting to said receiver hitch of said towing vehicle, a hitch bracket extending from said vertical support shaft and further attaching a horizontal hitch bar sleeve with an axial bore, connecting to said receiver hitch bar by a sleeve pin, and a pivotal lock bracket attaching to said receiver hitch bar by a bracket bolt; and a lower carriage unit defining a vertical carriage slide bar providing an upper end including a threaded shaft receiver accepting said lower threaded end of said inner threaded shaft as said vertical carriage slide bar slideably moves within said carriage slide receiver of said lower end of said vertical support shaft, said vertical carriage slide bar further defining a lower end attaching a carriage frame further defining a pair of lower horizontal frame members held in parallel by at least three cross braces and a wheel stand frame held vertically above said pair of lower horizontal frame members by a plurality of stand braces with said transverse support arm sleeve secured upon said lower horizontal frame members, and a transverse support arm sleeve having a sleeve bore from front to back, securing a first support arm and a second support arm attached together and further secured within said transverse support arm sleeve providing anchor points to secure said motorcycle within said lower carriage unit during transport of said motorcycle.

2. The motorcycle transport device, as disclosed in claim 1, wherein said electric jack motor is provided through connection of a socket plug and tow plug wire to the towing vehicle leading to an electrical junction box mounted to the vertical support shaft and defining a depending plug socket for connection to said motorcycle during tow for signaling purposes.

3. The motorcycle transport device, as disclosed in claim 1, said carriage frame further defining a said pair of lower horizontal frame members held parallel by a front cross brace, an intermediary cross brace and a rear cross brace and said wheel stand frame held vertically above said pair of lower horizontal frame members by a pair of front stand braces, a pair of intermediary stand braces, and a pair of rear stand braces with the transverse support arm sleeve secured upon said lower horizontal frame members, said transverse support arm sleeve having said sleeve bore from front to back; and said first support arm and the second support arm first attaching together within said transverse support arm sleeve, each said first and second support arm further defining an insert end, with an arm bore, aligning with said sleeve bore and accepting a common arm lock pin to hold them together and in place within said transverse support arm sleeve, each said first and second support arm further respectively extending outer ends defining respective strap tie anchors, used for an anchor point to secure said motorcycle in an erect position within said carriage frame during transport.

4. The motorcycle transport device, as disclosed in claim 1, said lower carriage unit is raised and lowered by activation of the electric jack motor between a transport position and a loading position, wherein said loading position, said lower horizontal frame members and the a rear cross brace are lowered to a ground surface as said front wheel of said motorcycle is driven into said lower carriage unit, said lower carriage unit subsequently by said electric jack motor to said transport position; and wherein a pivotal lock bracket attached to a front axial bore of said receiver hitch bar by a bracket bolt is attached to a transverse bore of said vertical carriage slide bar by a bracket pin to remove any force applied to said electric jack motor, said inner threaded shaft and said carriage slide receiver during transport, said bracket pin being removed prior to any further movement of said vertical slide bar or prior to returning said lower carriage unit to said loading position.

5. The motorcycle transport device, as disclosed in claim 1, further comprising other items as disclosed within the specification.

\* \* \* \* \*